United States

Miller

[11] 3,741,000

[5] June 26, 1973

[54] VIBRATION DENSITOMETER PROBE
[75] Inventor: Charles Evelengh Miller, Boulder, Colo.
[73] Assignee: International Telephone and Telegraph Corporation, New York, N.Y.
[22] Filed: Apr. 8, 1971
[21] Appl. No.: 132,312

[52] U.S. Cl. .................................. 73/32, 73/67.1
[51] Int. Cl. ............................................ G01n 9/00
[58] Field of Search .................. 73/32, 67.1, 67.2, 73/71.5, 194 B

[56] References Cited
UNITED STATES PATENTS

| 2,358,374 | 9/1944 | Ashcraft | 73/32 |
| 3,225,859 | 12/1965 | Davidson | 73/71.4 X |
| 3,449,940 | 6/1969 | Banks | 73/32 |

*Primary Examiner*—Richard C. Queisser
*Assistant Examiner*—Arthur E. Korkosz
*Attorney*—C. Cornell Remsen, Jr., Walter J. Baum, Paul W. Hemminger, Charles L. Johnson, Jr. and Thomas E. Kristofferson

[57] ABSTRACT

A probe for a vibration densitometer which avoids the use of a complicated and expensive resilient mount by employing a magnetostrictive hammer supported by a member having a mass substantially larger than that of the hammer. Resonant frequency—density analog error due to pipeline vibration is thus eliminated while at the same time the structure is simplified.

12 Claims, 7 Drawing Figures

PATENTED JUN 26 1973 3,741,000
SHEET 1 OF 2
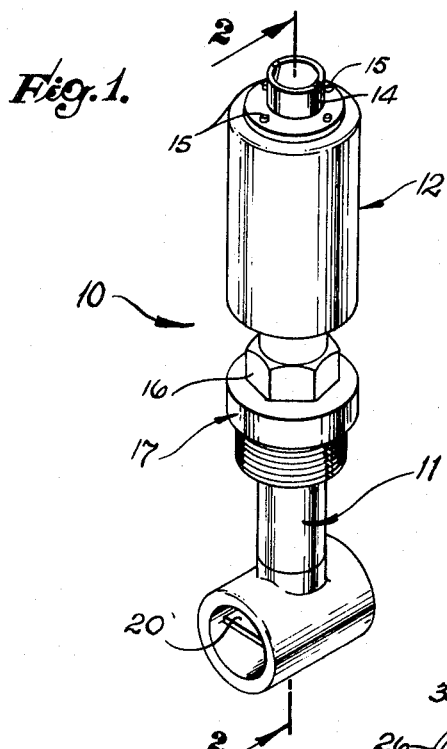
Fig. 1.
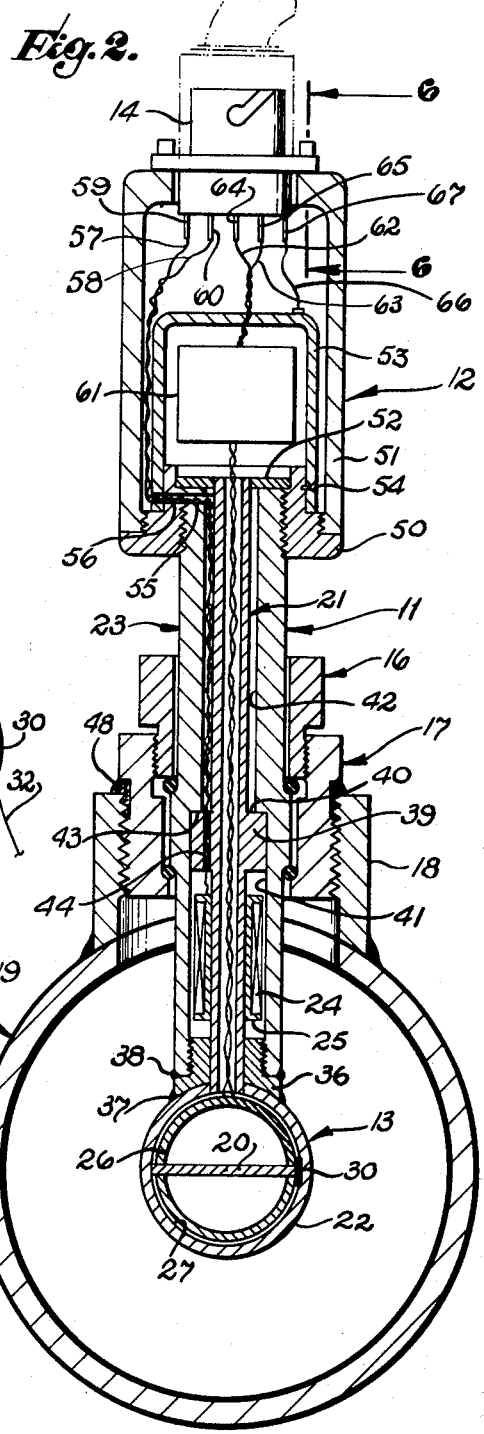
Fig. 2.
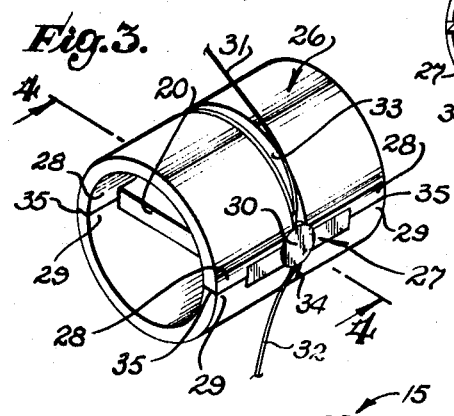
Fig. 3.
Fig. 4.
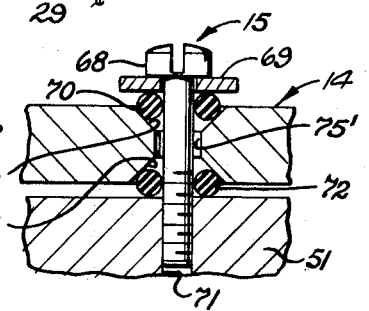
Fig. 6.
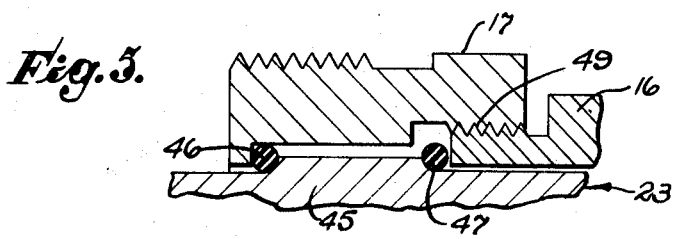
Fig. 5.
INVENTOR.
CHARLES E. MILLER
BY
ATTORNEY

VIBRATION DENSITOMETER PROBE

BACKGROUND OF THE INVENTION

This invention relates to devices for producing an analog signal which is a function of fluid density, and more particularly, to a vibration densitometer probe.

In the past, it has been difficult to obtain an accurate density analog from a vibration densitometer because the resonant frequency thereof has been shifted by pipeline vibration. One solution to this problem has been found. See copending application Ser. No. 65,371, now U.S. Pat. No. 3,677,067, filed Aug. 20, 1970, by C. E. Miller and G. L. Schlatter for DENSITOMETER. Said one solution has been to resiliently support the densitometer probe. This solution has the disadvantage that sometimes the resilient support must also act as a fluid seal. The resilient support is also expensive and requires extra time to assemble.

SUMMARY OF THE INVENTION

In accordance with the device of the present invention, the above-described disadvantages and the disadvantages of the prior art are overcome by providing a massive support for the hammer of a vibration densitometer probe. Although it is unexpected and the reasons therefor are unclear, the large support eliminates the resonant frequency shift error due to pipeline vibration while making a resilient support unnecessary. The expense and complication of such a support are thus eliminated.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a perspective view of a densitometer probe;

FIG. 2 is a sectional view of the probe taken on the line 2—2 shown in FIG. 1;

FIG. 3 is a perspective view of a group of component parts of the probe shown in FIG. 1;

FIG. 4 is a transverse sectional view of the assembly taken on the line 4—4 shown in FIG. 3;

FIG. 5 is an enlarged longitudinal sectional view of a portion of the probe shown in FIG. 1;

FIG. 6 is a longitudinal sectional view of a portion of mounting means for an electrical connector otherwise substantially fixed relative to the probe taken on the line 6—6 shown in FIG. 2.

DESCRIPTION OF THE PREFERRED EMBODIMENT

Figure 7:
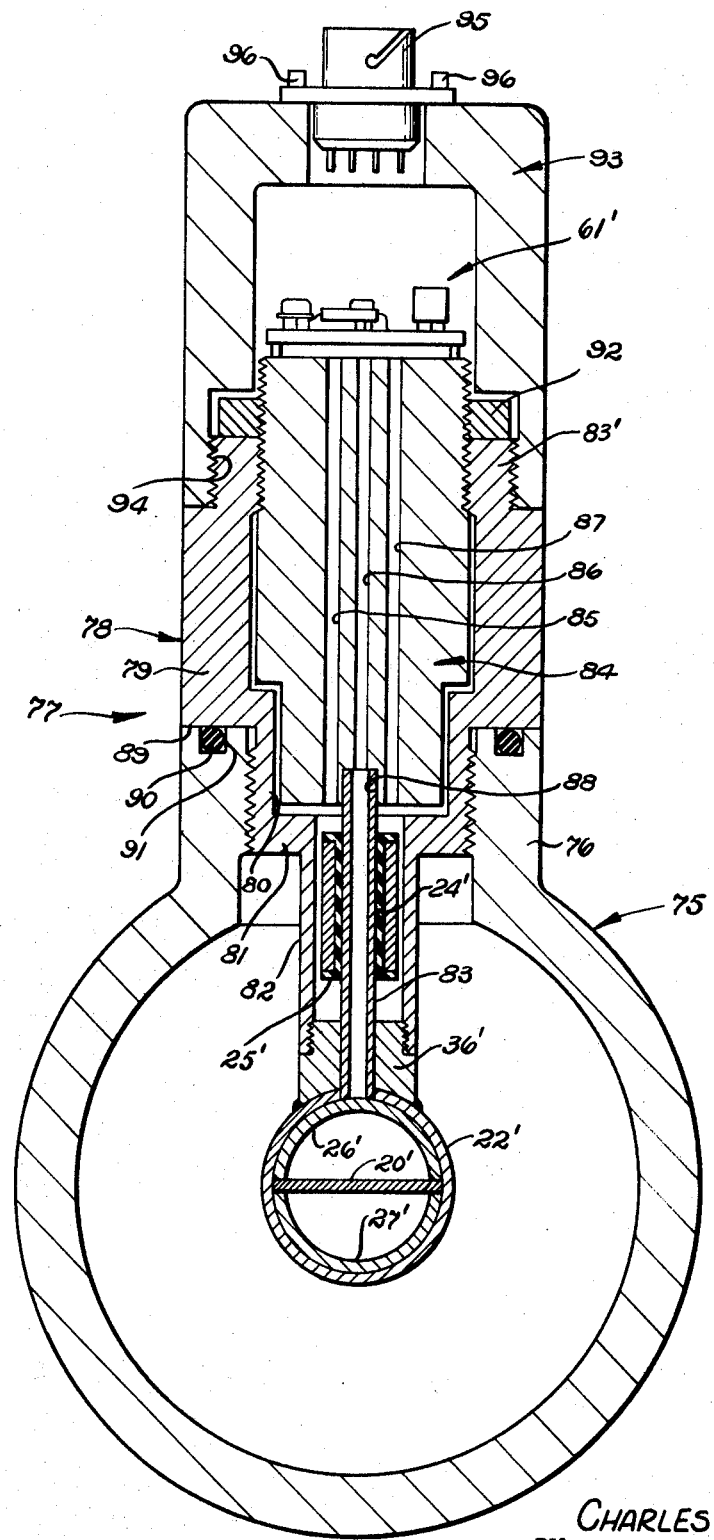
FIG. 7 is a longitudinal sectional view through a densitometer probe constructed in accordance with the present invention.

FIGS. 1 to 6, inclusive, are identical to those in copending application Ser. No. 65,371, filed Aug. 20, 1970, now U.S. Pat. No. 3,677,067, by C. E. Miller and G. L. Schlatter for DENSITOMETER.

In FIG. 1, the probe is indicated at 10 having a shank 11, a housing 12 at its upper end, a tubular assembly 13 at its lower end, and an electrical connector assembly 14 at the upper end of housing 12 fixed thereto by bolts 15. Annular fittings 16 and 17 extend around shank 11 for mounting probe 10 in a hollow cylindrical extension 18 of a pipeline 19, as shown in FIG. 2.

As shown in FIGS. 1 and 2, a stainless steel vane 20 is mounted in assembly 13 in a position perpendicular to the axis of a hollow cylindrical magnetostrictive inner tube 21. Vane 20, if desired, may be also mounted in a symmetrical position with respect to the axis of an outer sleeve 22 which houses it.

Vane 20 may be a reactangular plate having flat and parallel upper and lower surfaces as shown in FIG. 2, and may otherwise have mutually normal surfaces forming a right parallelopiped.

Shank 11 not only includes inner tube 21, but an outer magnetic tube 23. A driven coil or solenoid winding 24 wound on a nylon bobbin 25 is press fit onto the external surface of inner tube 21 and located in a space between the tubes 21 and 23 toward the lower end of shank 11. Coil 24 is thus maintained in a substantially fixed position on inner tube 21, although the same is not necessarily critical to the operation of the device of the present invention.

Vane 20 is supported between two half cylinders 26 and 27 as shown in FIGS. 2 and 3. According to the invention, the longitudinal edges of vane 20 are pressed together between half cylinders 26 and 27 with a pressure of, for example, 20,000 pounds per square inch because the assembly shown in FIG. 3 is inserted in sleeve 22 with an interference fit, sleeve 22 being heated prior to the said insertion.

Half cylinder 26 has four projections 28, and half cylinder 27 has four projections 29. Projections 28 and 29 serve to prevent longitudinal movement of vane 20 between half cylinder 26 and half cylinder 27 although the same is not likely due to the clamping pressure on vane 20 between half cylinder 26 and half cylinder 27.

Half cylinders 26 and 27, and vane 20 may be machined to have a flat or recess to receive a piezoelectric crystal 30. Crystal 30 has electrical leads 31 and 32 which extend around half cylinders 26 and 27 in grooves 33 and 34, respectively, to a point where they enter the hollow interior of inner tube 21. This entry is made at the lower end of inner tube 21, as shown in FIG. 2.

As shown in FIG. 3, projections 28 and 29 may have a slight separation at 35 to insure that the pressure contact of half cylinders 26 and 27 on vane 20 is quite high due to the said interference fit.

As shown in FIG. 2, a boss 36 is welded at 37 to sleeve 13 in a fluid tight manner. Although the device of the present invention need not always be fluid tight throughout, a glass-to-metal seal or other seal may be provided inside innertube 21 for leads 31 and 32. Before the said interference fit is provided, if desired, crystal 30, and those portions of leads 31 and 32 in grooves 33 and 34, respectively, may be potted with an epoxy. Further, after the interference fit has been effected, the entire unit, when completely assembled, may be treated further by applying a bonding agent around all of the structures inside sleeve 22. Any conventional bonding process may be employed including, but not limited to, the application of a bonding agent sold under the name of "Locktite."

As stated previously, boss 36 may be welded to sleeve 22 and 37 in a fluid tight manner. Further, outer tube 23 may be threaded onto boss 36 and welded thereto at 38 in a fluid tight manner. For all practical purposes, boss 36 may thus be considered an integral part of outer tube 23. Boss 36, for example, is also made of a magnetic material. All of the "magnetic materials" referred to herein may be any magnetic material including, but not limited to, any stainless steel or 416 stainless steel. However, inner tube 21, although being magnetic, must also be magnetostrictive. Notwithstanding this limitation, it is to be noted that inner tube 21 is employed to produce vibration, and if one feature of the present invention is used without another, the use of a magnetostrictive or magnetic material may not be required, and the invention still practiced.

Inner tube 21 has an annular projection 39 with a shoulder 40. Outer tube 23 has a lower bore 41 separated from a smaller upper counter bore 42 by an annular shoulders 43. Shoulder 40 and 43 abut. From shoulder 40 to the lower end of inner tube 21, inner tube 21 is always in axial compression. That is, inner tube 21 is in compression when coil 24 is energized, but inner tube 21 is also in compression when coil 24 is deenergized. Coil 24 is energized with an alternating current which thus merely changes the degree of compression of inner tube 21.

Projection 39 has a hole 44 through which the electrical leads of coil 24 can pass from the location of coil 24 upwardly between tubes 21 and 23.

The manner in which probe 10 is mounted in pipeline 19 is better illustrated in FIG. 5. In FIGS. 5, note will be taken that outer tube 23 has an outwardly extending radial projection 45 on each side of which rubber O-rings 46 and 47 are compressed by fittings 16 and 17. Fitting 17 is threaded into extension 18 and sealed thereto by a conventional sealing compound 48 shown in FIG. 2. In FIG. 5, note will be taken that fitting 16 is threaded inside fitting 17 at 49. The amount O-rings 46 and 47 are compressed is, therefore, determined by the position of fitting 16. That is, fitting 16 is turned, for example, by a wrench, until the desired O-ring compression is reached.

From the construction illustrated in FIG. 5, not will be taken that only O-rings 46 and 47 contact outer tube 23, and that, therefore, shank 11 is never touched by either fitting 16 or fitting 17.

It is an advantage of the present invention that the construction of probe 10 is such that the leads from coil 24 are kept magnetically separate from the leads from crystal 30. This is true through a portion of housing 12 as will be described. Housing 12 has a fitting 50 threaded onto outer tube 23. A cylinder 51 is threaded to fitting 50. A washer 52 is press fit and thereby fixed in fitting 50 and around inner tube 21. Inner tube 21 has an upper end which may be fixed relative to or slidable in washer 52, as desired. However, preferably the external surface of inner tube 21 at its upper end fits contiguous or in contact with the surface of washer 52 defining the hole therethrough. A shield 53 made of a magnetic material may be fixed around fitting 50 by one or two or more screws 54. Outer tube 23 has a radial hole 55 therethrough through which the leads from coil 24 pass. Fitting 50 has a hole 56 therethrough in alignment with hole 55 through which the leads from coil 24 pass. From the outward radial extremity of hole 56, the coil leads indicated at 57 and 58 pass upwardly between cylinders 51 and shield 53 and are connected to pins 59 and 60 of the electrical connector 14. Electrical connector 14 may be a conventional five pin connector.

As stated previously, the leads 31 and 32 from crystal 30 extend upwardly through the interior of inner tube 21. At the upper end of inner tube 21, as shown in FIG. 2, leads 31 and 32 are connected to the input of differential amplifier 61. Leads 31 and 32 thus extend outwardly through the upper opening in inner tube 21.

Differential amplifier 61 may be entirely conventional, and mounted on a conventional card, if desired. Amplifier 61 may be supported inside shield 53 by any conventional means, if desired, or simply supported by the strength of leads 31 and 32, and output leads 62 and 63 which are connected to pins 64 and 65 of connector 14, respectively. A lead 66 provides a ground connection from shield 53 to the fifth pin 67 of connector 14.

The manner in which connector 14 is mounted on cylinder 51 is shown in FIG. 6. Only one bolt 15 is shown in FIG. 6 since all bolts 15 are similarly situated. In FIG. 6, bolt 15 is shown having a head 68, a washer 69 under head 68, an O-ring 70 under washer 69 and a shank 71 threaded into cylinder 51. A second O-ring 72 also extends around screw shank 71. O-ring 70 fits between the lower surface of washer 69 and a counter sunk frusto-conical hole 73 in connector 14. O-ring 72 fits between the upper surface of cylinder 51 and another counter sunk frusto-conical hole 74 in connector 14. Holes 73 and 74 are connected by a bore 75'. From FIG. 6, it will be noted that all the sturctures shown therein may vibrate, but that the amount of vibration transmitted to connector 14 may be quite small.

According to an outstanding feature of the present invention, the more complicated resilient mount of the probe 10, shown in FIG. 2, is avoided by the construction shown in FIG. 7.

In FIG. 7, a pipeline is indicated at 75 having a hollow boss 76 in which a probe 77 is located.

Probe 77 has a housing 78 including an upper heavier portion 79, an intermediate portion 80, a transverse portion 81 and a hollow portion 82. A small portion 83' extends above portion 79. All of the portions 79, 80, 81, 82 and 83' are integral with one another.

Parts 22', 26', 27' and 36' may, if desired, be identical to parts 22, 26, 27 and 36, respectively, shown in FIG. 2.

Parts 26' and 27' have grooves 33 and 34 therein, but these are not shown in FIG. 7 for clarity. The same is true of a crystal identical to crystal 30 and all of the electrical leads.

As before, boss 36' forms a hollow cylinder or ferrule which has a reduced diameter portion at its upper end to which housing portion 82 is threaded.

A magnetostrictive tube 83 has its lower end slidable through ferrule 36' and cylinder 22'. Tube 83 lies in engagement with an upper portion of the external cylindrical surface of cylinder 26', as before. The lower end of tube 83 is not bonded to the cylinder 26'.

The upper end of tube 83 is press fit into a supporting body 84. Body 84 has three holes 85, 86 and 87 extending completely therethrough in a vertical or axial direction. Body 84 has a counter bore 88 into which tube 83 is press fit, as aforesaid.

The external surface of housing portion 80 is threaded into boss 76. Housing 78 may thus be fixed rigidly relative to pipeline 75. Housing portion 79 has a shoulder 89 which abuts the upper end of boss 76. An O-ring 90 is located in a groove 91 in the upper end of boss 76 to provide a fluid tight seal thereat.

As before, a spool 25' identical to spool 25 is press fit on tube 83. Spool 25' carries a coil 24' identical to coil 24.

The passages 85 and 87 are provided in body 84 for the coil leads. The passage 86 in body 84 aligns with the hole through tube 83 to provide a path through which the crystal leads may be threaded.

Although it is not critical which particular types of materials are employed for body 84, housing 78 and tube 83, preferably tube 83 is made of Ni Span C which normally has a density between 2.89 and 2.91 pounds per cubic inch. Preferably housing 78 and body 84 are made of a magnetic material such as 416 stainless steel which has a density of about 2.78 pounds per cubic inch.

Housing portion 83' is internally and externally threaded. The upper end of body 84 is threaded into housing 78 at portion 83'. A jam nut 92 holds body 84 in a fixed position relative to housing 78.

A differential amplifier 61' is fixed relative to body 84 and may be identical to amplifier 61, shown diagrammatically in FIG. 2. An end cap 93 has an internal thread 94 which is threaded externally to housing portion 83'. A conventional electrical connector 95 is fixed to cap 93 by bolts 96. A resilient mounting for connector 95 is thus not required as illustrated in FIGS. 2 and 6 for electrical connector 14.

In the assembly of the portion of FIG. 7, before end cap 93 is assembled to housing 78, and before jam nut 92 is threaded onto the upper end of body 84, body 84 is turned by hand, i.e., with the fingers, until tube 83 is placed in moderate compression against cylinder 26'. Jam nut 92 is then run down tight against the upper end of housing portion 83', and cap 93 is threaded thereto.

Note will be taken that body 84 is much larger than tube 83. It is much larger both in volume and in weight. That is, body 84 has a mass which is substantially larger that that of tube 83. For example, the mass of body 84 may be several times as large as that of tube 83. Further, the mass of body 84 may be in excess of 10 to 80 times that of tube 83.

As stated previously, the mechanism of the improvement in accuracy is not known, but it is known that the use of body 84 with a mass substantially larger than that of tube 83 prevents any substantial frequency error which, in turn, results in an inaccurate density indication or the production of an inaccurate density analog signal.

The aforesaid copending application Ser. No. 65,371 is, by this reference hereto, incorporated herein as fully set forth hereat. The same is true of another copending application hereby identified as C. E. Miller 4, filed on or about Mar. 10, 1971, by C. E. Miller for DENSITOMETER.

Said application Ser. No. 65,371, incorporated by reference hereinabove, is now issued U.S. Pat. No. 3,667,067. This patent clearly sets forth and/or describes all information required to practice the present invention including, but not limited to, the function and cooperation with the rest of the device of crystal 30.

Note will be taken that cylinders 26 and 27, shown in FIGS. 1-4, inclusive, may be integral and vane 20 bonded thereto as disclosed in said application C. E. Miller 4. Thus, vane 20', shown in FIG. 7, which may be identical to vane 20, may be either clamped between or bonded to cylinders 26' and 27'.

Note will be taken that in FIG. 7, body 84 has a portion between its lower end, as viewed in FIG. 7, and a point along the length thereof where it is fixed relative to housing 78 by the threaded engagement of body 84 with housing 78 and jam nut 92.

Note will also be taken that in FIG. 7, the said portion of body 84 has a mass which is substantially larger than that of tube 83.

Typically, body 84 and tube 83 may have lengths which are of the same order of magnitude. Body 84 has a cross-sectional area substantially larger than that of tube 83. Body 84 is fixed to housing 78 at a position along the length of body 84 in the vicinity of jam nut 92, which position is spaced from the lower end of body 84 as viewed in FIG. 7 a distance greater than one-half the length of body 84.

What is claimed is:

1. Vibration producing means for a vibration densitometer comprising: a structure to be vibrated; a housing; first means suporting said structure from said housing; a first member; a second member fixed to said housing, said first member being fixed to said second member, said first member being in a position lying in engagement with said structure, said second member having a mass greater than that of said first member; and second means to cause said first member to vibrate said structure at its area of engagement therewith.

2. The invention as defined in claim 1, wherein said members are elongated, one end of said first member being fixed relative to one end of said second member, said second member being fixed relative to said housing at a point along the length of said second member spaced from said one end thereof.

3. The invention as defined in claim 2, wherein the portion of the mass of said second member between said one end thereof and said point is larger than that of said first member.

4. The invention as defined in claim 3, wherein the portion of said second member mass is over ten times greater than said first member mass.

5. The invention as defined in claim 4, wherein the portion of said second member mass is over forty times greater than said first member mass.

6. The invention as defined in claim 2, wherein said second member is fixed rigidly to said housing at said point, fluid container means having an opening thereinto, and third means to hold said housing rigid with said fluid container means in a position such that said structure is supported by said first means through said opening inside said fluid container means.

7. The invention as defined in claim 6, wherein said first member is always held in compression between said second member and said structure.

8. The invention as defined in claim 6, wherein said first member is made of a magnetostrictive material, said second means including a solenoid winding in the form of a hollow cylinder, said first member projecting through the hole in said solenoid cylinder, and means to support said solenoid winding around said first member.

9. The invention as defined in claim 2, wherein said members have lengths of the same order of magnitude, said second member having a cross sectional area substantially larger than that of said first member, said second member being fixed to said housing at a position along the length of said second member spaced from said one end thereof a distance greater than one-half the length thereof.

10. The invention as defined in claim 9, wherein said housing is hollow and approximately cylindrical having an internal thread at its upper end, said first means including a first hollow cylinder concentric and integral with said housing connected from and extending downwardly below the lower end thereof, a second hollow cylinder concentric with and integral with said first cylinder connected from and extending downwardly below the lower end thereof, said second cylinder including a fluid tight seal closing off the lower end of said second cylinder, said first member being generally in the shape of a hollow tube with a concentric internal bore, said second member being generally in the shape of a solid cylinder, said second member having one axial bore completely therethrough in alignment with said tube bore, said member having at least one other axial bore extending completely therethrough, said second member having a bore counter to said one bore at said one end thereof, said one tube end being press fit into said counterbore, the mass of said second member being over ten times greater than that of said first member, said first member being made of a magnetostrictive material, an insulator spool press fit onto said tube, a soilnoid winding fixed around said spool, said first means including a ferrule threaded into the lower end of said second cylinder and sealed thereto, said ferrule having a hole therethrough with a bore in which said tube is slidable, a third cylinder sealed to said ferrule, said third open, hollow cylinder having an axis perpendicular to that of said ferrule, said third cylinder having a hole through the wall thereof in axial alignment with that of said ferrule inside said second cylinder, said third cylinder hole having a diameter such that said tube is slidable therethrough, a fourth cylinder in compression and concentric with said third cylinder, a vane fixed with said fourth cylinder in a position through the axis thereof perpendicular to said tube axis, said tube being in axial compression against said fourth cylinder, said second member being threaded into said housing, a jamb nut threaded onto said second member to fix the position thereof relative to said housing, said second member, said spool, said solenoid winding and said tube all being everywhere spaced from said housing and said first and second cylinders except at the said thread connection of said second member with said housing, said first cylinder having an external thread for mounting in a pipeline containing fluid.

11. The invention as defined in claim 1, including fluid container means having an opening thereinto, and third means to hold said housing rigid with said fluid container means in a position such that said structure is supported by said first means through said opening inside said fluid container means.

12. A driving arrangement for a vibration densitometer probe, said driving arrangement comprising: a structure to be vibrated; a housing; first means supporting said structure from said housing; a first member; a second member fixed relative to said housing, said first member being fixed relative to said second member in a position lying in engagement with said structure, said second member having a mass greater than that of said first member; second means to cause said first member to vibrate said structure at its area of engagement therewith, said members being elongated, one end of said first member being fixed relative to end of said second member, said second member being fixed relative to said housing at a point along the length of said second member spaced from said one end thereof, said second member being fixed rigidly to said housing at said point; fluid container means having an opening thereinto; and third means to hold said housing rigid with said fluid container means in a position such that said structure is supported by said first means through said opening inside said fluid container means, the portion of the mass of said second member between said one end thereof and said point being larger than that of said first member, the portion of said second member mass being over ten times greater than said first said member mass.

* * * * *